(12) United States Patent
Lim et al.

(10) Patent No.: US 9,781,339 B2
(45) Date of Patent: Oct. 3, 2017

(54) METHOD AND APPARATUS FOR COUNTING NUMBER OF PERSON USING PLURALITY OF CAMERAS

(71) Applicant: HANWHA TECHWIN CO.,LTD., Changwon-Si (KR)

(72) Inventors: Jeong-Eun Lim, Changwon (KR); Seung-In Noh, Changwon (KR); Ha-Na Hong, Changwon (KR)

(73) Assignee: Hanwha Techwin Co., Ltd., Changwom-si (KR)

( * ) Notice: Subject to any disclaimer, the term of this patent is extended or adjusted under 35 U.S.C. 154(b) by 687 days.

(21) Appl. No.: 14/053,732

(22) Filed: Oct. 15, 2013

(65) Prior Publication Data
US 2014/0152763 A1    Jun. 5, 2014

(30) Foreign Application Priority Data

Nov. 30, 2012 (KR) .................. 10-2012-0138436

(51) Int. Cl.
*H04N 5/232* (2006.01)
*G06K 9/00* (2006.01)

(52) U.S. Cl.
CPC ..... *H04N 5/23238* (2013.01); *G06K 9/00778* (2013.01)

(58) Field of Classification Search
None
See application file for complete search history.

(56) References Cited

U.S. PATENT DOCUMENTS

| 4,303,851 A | * | 12/1981 | Mottier .................. G07C 9/00 377/45 |
| 5,926,518 A | * | 7/1999 | Asokawa ................ G07C 9/00 377/10 |
| 6,733,138 B2 | | 5/2004 | Raskar |

(Continued)

FOREIGN PATENT DOCUMENTS

| JP | 10-49718 A | 2/1998 |
| JP | 11-185008 A | 7/1999 |

(Continued)

OTHER PUBLICATIONS

Barandiaran et al., "Real-Time People Counting Using Multiple Lines," May 7-9, 2008, Ninth Internaltional Workshop on Image Analysis for Multimedia Interactive Services, pp. 159-162.*

(Continued)

*Primary Examiner* — Joseph Ustaris
*Assistant Examiner* — Edemio Navas, Jr.
(74) *Attorney, Agent, or Firm* — Sughrue Mion, PLLC

(57) ABSTRACT

A person counting device generates a single panorama image by using a plurality of images respectively captured by a plurality of cameras, inserts an imaginary line to the single panorama image; and counts the number of persons that pass the imaginary line. To this end, identification numbers are allocated to respective persons in the plurality of images, the single panorama image including the imaginary line is restored to a plurality of images including same imaginary line information, the number of persons that pass a new imaginary line in each of the plurality of restored images is determined, and the number of duplicate-counted persons is ruled out.

19 Claims, 10 Drawing Sheets

(56) References Cited

U.S. PATENT DOCUMENTS

| | | | | |
|---|---|---|---|---|
| 7,535,499 | B2* | 5/2009 | Takata | H04N 5/2624 348/218.1 |
| 8,861,890 | B2* | 10/2014 | Lefler | G06F 3/0483 345/473 |
| 8,902,308 | B2* | 12/2014 | Rinner | G06T 7/0028 348/117 |
| 2006/0244826 | A1* | 11/2006 | Chew | G01S 3/7865 348/143 |
| 2008/0313165 | A1* | 12/2008 | Wu | G06Q 10/101 |
| 2009/0046147 | A1* | 2/2009 | Henson | G08B 13/19604 348/143 |
| 2009/0309987 | A1* | 12/2009 | Kimura | G06T 3/4038 348/218.1 |
| 2010/0046827 | A1* | 2/2010 | Anderson | G06K 9/00778 382/141 |
| 2012/0121128 | A1* | 5/2012 | Lawrence | A63F 13/06 382/103 |
| 2013/0148848 | A1* | 6/2013 | Lee | G06K 9/00771 382/103 |
| 2014/0009608 | A1* | 1/2014 | Heier | H04N 7/18 348/143 |

FOREIGN PATENT DOCUMENTS

| | | |
|---|---|---|
| JP | 2003-259337 A | 9/2003 |
| JP | 2005-353004 A | 12/2005 |
| JP | 4374609 B2 | 12/2009 |
| KR | 10-2008-0007849 A | 1/2008 |

OTHER PUBLICATIONS

Communication dated Dec. 12, 2016 issued by the Korean Intellectual Property Office in Korean Patent Application No. 10-2012-0138436.

* cited by examiner

COUNTABLE REGION

METHOD AND APPARATUS FOR COUNTING NUMBER OF PERSON USING PLURALITY OF CAMERAS

CROSS-REFERENCE TO RELATED APPLICATION(S)

This application claims the benefit of Korean Patent Application No. 10-2012-0138436 filed on Nov. 30, 2012, in the Korean Intellectual Property Office, the disclosure of which is incorporated herein in its entirety by reference.

BACKGROUND

1. Field

Apparatuses and methods consistent with exemplary embodiments relate to a method and an apparatus for counting the number of person using a plurality of cameras.

2. Description of the Related Art

Along with development of closed-circuit television (CCTV) video security technologies, demand for intelligent video security technologies is increasing. Real-time surveillance systems, which is a technological field from among the intelligent video security technologies, are applicable to various purposes and at various locations including major national infrastructures, such as airports, military facilities, harbors, roads, and bridges, subways, buses, buildings, stadiums, parking lots, casinos, automobiles, mobile devices, etc.

In the related art, to count the number of persons in a real-time surveillance system, a single camera is installed in a vertical angle or a lateral angle. Furthermore, if a space for counting the number of persons therein requires more than one camera or if is difficult to count the number of persons using a single camera, a plurality of cameras are installed to count the number of persons.

However, if a plurality of cameras are installed, regions respectively covered by the cameras may overlap one another, and thus an accuracy of counting the number of persons is deteriorated.

SUMMARY

In the related art, in a case of counting the number of persons by using a plurality of cameras, regions respectively covered by the cameras overlap one another, and thus it is difficult to accurately count the number of persons. In other cases of counting the number of persons using a plurality of cameras, spaces are formed between regions respectively covered by the cameras, and thus some persons are not counted. One or more exemplary embodiment is intended to reduce errors in counting the number of persons by resolving duplicated counting or counting omissions of the number of persons.

Additional aspects will be set forth in part in the description which follows and, in part, will be apparent from the description, or may be learned by practice of exemplary embodiments.

Exemplary embodiments address at least the above problems and/or disadvantage and other disadvantages not described above. Also, exemplary embodiments are not required to overcome the disadvantages described above, and an exemplary embodiment may not overcome any of the problems described above.

According to an aspect of an exemplary embodiment, there is provided a person counting device includes a single panorama image generator configured to match a plurality of images respectively captured by a plurality of cameras and generate a single panorama image; a line inserter configured to insert an imaginary line to the single panorama image; and a person counter configured to allocate identification numbers to respective persons in the plurality of images and count the number of persons that pass the imaginary line, wherein the person counter includes an image restorer configured to restore the single panorama image including the imaginary line to a plurality of images including same imaginary line information and determine the number of persons that pass a new imaginary line in each of the plurality of restored images, wherein each of the new imaginary line inserted in each of the plurality of the restored images is derived from the same imaginary line information; and a duplication remover configure to rule out a number of duplicate-counted persons by using the identification numbers allocated to the respective persons in the plurality of images and imaginary line information.

According to an aspect of another exemplary embodiment, there is provided a method of counting a number of persons, the method includes matching a plurality of images respectively captured by a plurality of cameras and generating a single panorama image; inserting an imaginary line into the single panorama image; allocating identification numbers to respective persons in the plurality of images and counting the number of persons that pass the imaginary line, wherein the allocating and counting includes restoring the single panorama image including the imaginary line to a plurality of images including same imaginary line information; determining the number of persons that pass a new imaginary line in each of the plurality of restored images, wherein each of the new imaginary lines inserted in each of the plurality of the restored images is derived from the same imaginary line information; and ruling out a number of duplicate-counted persons by using the identification numbers allocated to the respective persons in the plurality of images and imaginary line information.

According to an aspect of another exemplary embodiment, there is provided a method of counting a number of persons with a system including a plurality of cameras, the method including generating a single panorama image based on a plurality of images captured by the respective plurality of cameras; inserting an imaginary line into the single panorama image; restoring the single panorama image including the imaginary line into a plurality of sub-images including same imaginary line information; inserting an imaginary line into each of the plurality of sub-images; counting the number of persons that pass each imaginary line in each of the plurality of sub-images; and adjusting the counted number of persons by subtracting a number of duplicate counted persons.

BRIEF DESCRIPTION OF THE DRAWINGS

The above and/or other aspects will become more apparent by describing in detail exemplary embodiments, taken in conjunction with the accompanying drawings in which.

DETAILED DESCRIPTION OF EXEMPLARY EMBODIMENTS

Figure 1:
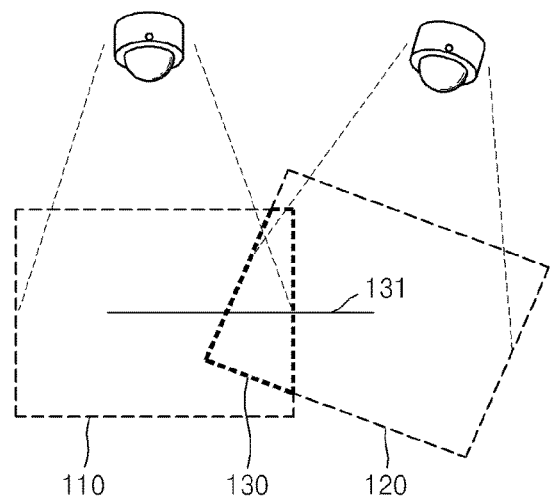
FIG. 1 shows an example of real-time surveillance of a particular area by using two cameras.

Reference will now be made in detail to exemplary embodiments, examples of which are illustrated in the accompanying drawings, in which like reference numerals refer to the like elements throughout. In this regard, exemplary embodiments may have different forms and should not be construed as being limited to the descriptions set forth herein. Well-known functions or constructions are not described in detail since they would obscure exemplary embodiments with unnecessary detail. Accordingly, exemplary embodiments are merely described below, by referring to the figures, to assist in a comprehensive understanding of exemplary embodiments.

FIG. 1 shows an example of real-time surveillance of a particular area by using two cameras. As shown in FIG. 1, persons passing a preset imaginary line 131 may be photographed and watched by using a plurality of cameras. The number of persons passing the imaginary line 131 may be used for counting the number of persons passing an entrance of a shopping mall or counting the number of persons passing an entrance of a restricted area, for example.

If cameras are arranged as shown in FIG. 1 and perform surveillance, an overlapping region 130 may be formed between surveillance regions of a first camera and a second camera.

Figure 2:
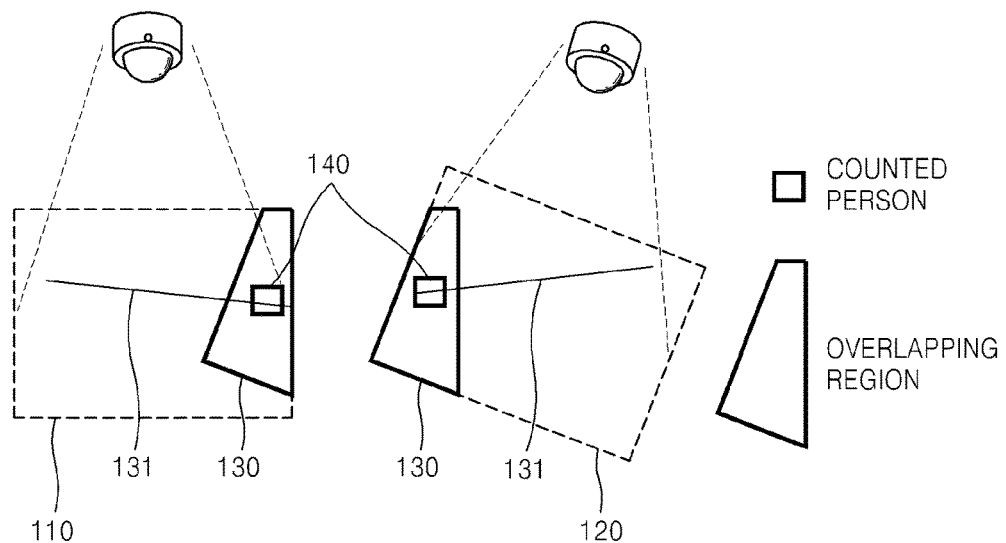
FIG. 2 shows an example of counting the number of persons passing a common imaginary line set in surveillance regions of a plurality of cameras arranged as shown in FIG. 1.

FIG. 2 shows an example of counting the number of persons passing a common imaginary line 131 set in surveillance regions of a plurality of cameras arranged as shown in FIG. 1. FIG. 2 shows an example in which imaginary lines 131 of surveillance regions of a plurality of cameras arranged as shown in FIG. 1 overlap each other in the overlapping region 130 between respective the surveillance regions.

In this case, if there is a person 140 at the imaginary line 131 in the overlapping region 130, the person 140 may be counted at both an imaginary line 131 of a first camera surveillance region 110 and an imaginary line 131 of a second camera surveillance region 120. As a result, the number of persons is counted in the first camera surveillance region 110 and the number of persons is also counted in the second camera surveillance region 120, and thus the number of persons may be counted twice.

Figure 3:
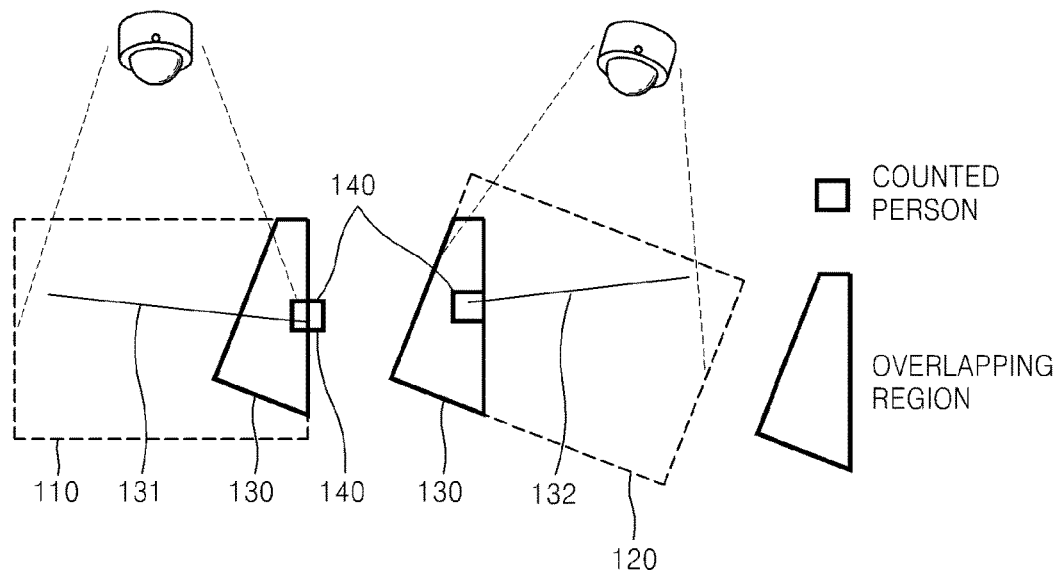
FIG. 3 shows an example in which camera surveillance regions of a plurality of cameras arranged as shown in FIG. 1 are set to have different imaginary lines, such that an imaginary line and another imaginary line do not overlap each other in an overlapping region.

FIG. 3 shows an example in which camera surveillance regions of a plurality of cameras arranged as shown in FIG. 1 are set to have different imaginary lines, such that the imaginary line 131 and an imaginary line 132 do not overlap each other in the overlapping region 130.

Even in a case where the different imaginary lines 131 and 132 are set with respect to the same overlapping region 130, a person 140 passing at an end of the imaginary line 131 may also be detected at the imaginary line 132 of the adjacent camera. Therefore, the person 140 may likely be counted twice.

In the examples shown in FIGS. 2 and 3, only one actual person passes an imaginary line, and thus the total number of persons is one. However, it is highly probable that the person is counted in surveillance regions of the both cameras and the total number of person counted from both cameras is incorrectly determined as two.

Figure 4:
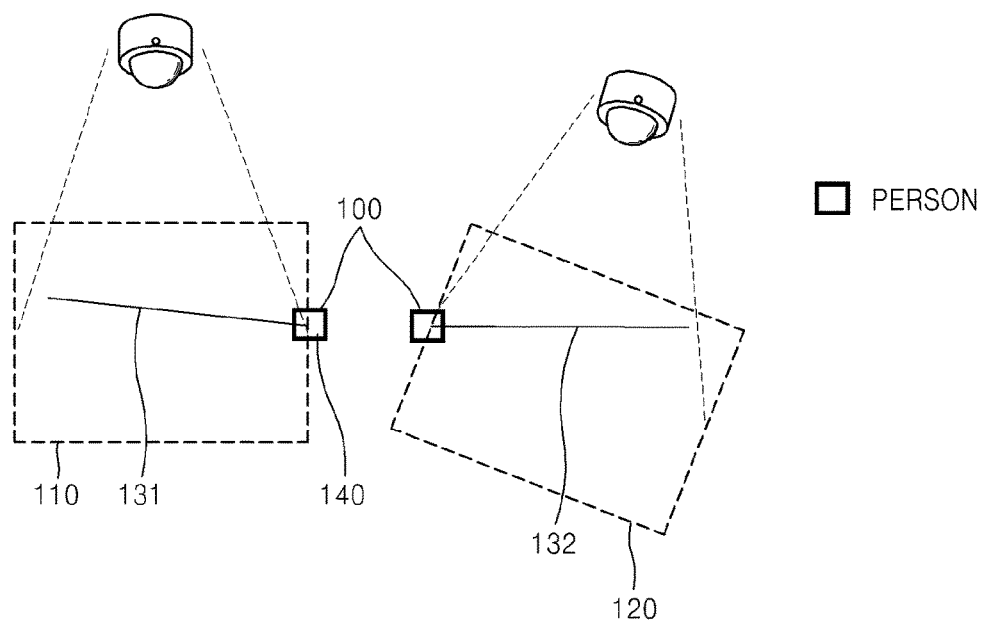
FIG. 4 shows an example in which surveillance regions of a plurality of cameras do not overlap one another and imaginary lines thereof do not overlap one another.

FIG. 4 shows an example in which surveillance regions of a plurality of cameras do not overlap one another and imaginary lines thereof do not overlap one another.

In FIG. 4, although the surveillance region of a first camera and the surveillance region of a second camera do not overlap each other and imaginary lines thereof do not overlap each other, if a person 100 to be counted passes the boundary of the first camera surveillance region 110 and moves to the second camera surveillance region 120, images captured by the first camera and the second camera do not contain sufficient regions for counting the person 100, and thus the person may be counted neither at the imaginary line 131 of the first camera nor the imaginary line 132 of the second camera.

Figure 5:
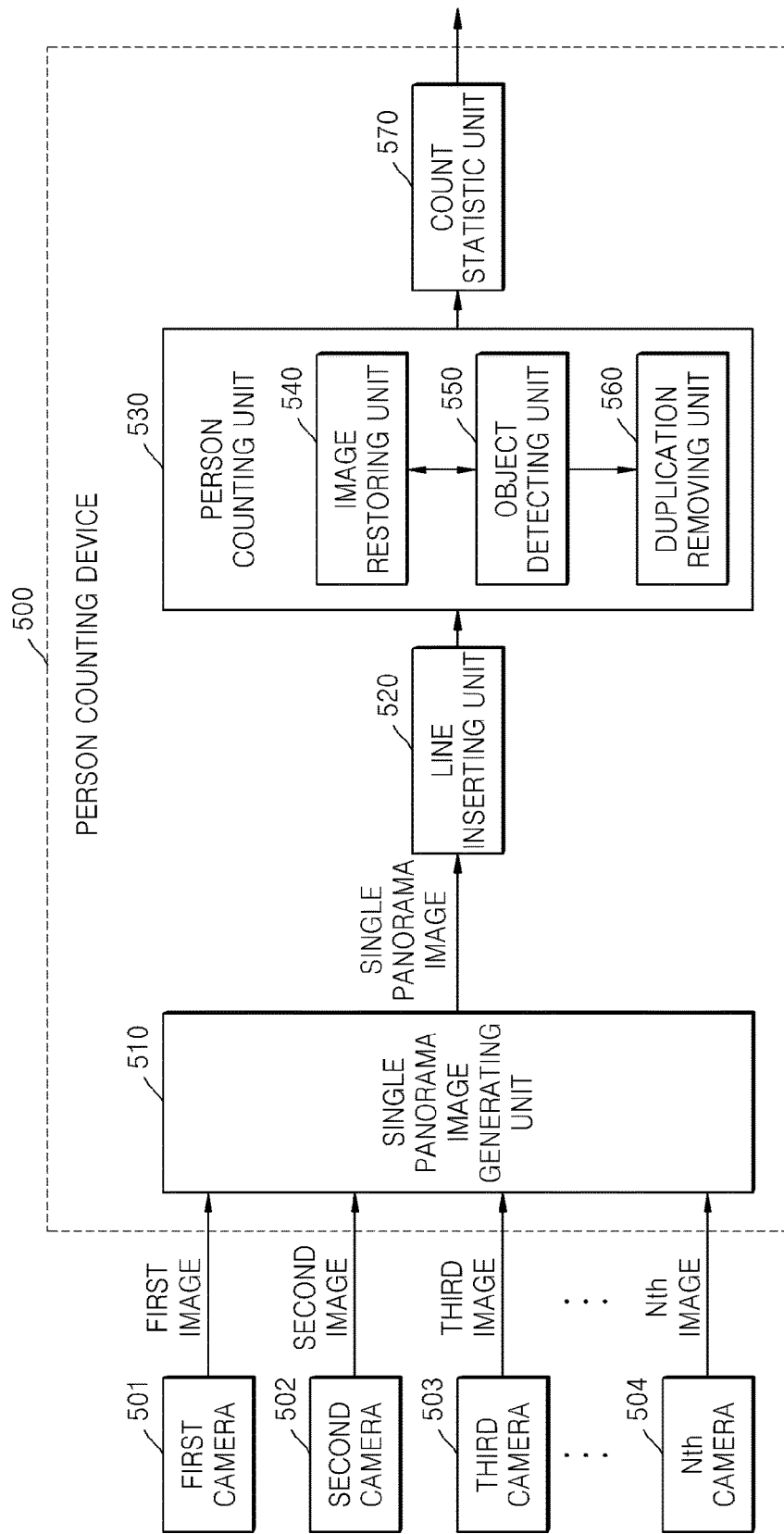
FIG. 5 shows the internal configuration of a person counting device according to an exemplary embodiment.

FIG. 5 shows the internal configuration of a person counting device 500 according to an exemplary embodiment.

According to an exemplary embodiment, a person counting device which resolves the problems shown in FIGS. 2 through 4 is provided. According to an exemplary embodiment, the person counting device 500 generates a single panorama image based on a plurality of images captured by a plurality of cameras 501, 502, 503, and 504 installed at different places, inserts an imaginary line into the single panorama image, converts the single panorama image including the imaginary line into a plurality of images including same imaginary line information, which is derived from the imaginary line inserted in the single panorama image, and counts the number of people passing an imaginary line, which is newly inserted in each of the plurality of images using the same imaginary line information. As a result, duplicate counting of the number of persons in the related art may be resolved.

First, during the generation of a single panorama image based on a plurality of images, a plurality of images adjacent to one another are combined as a single panoramic image on a same plane, thereby resolving the problem of not photographing or detecting a person (refer to FIG. 4).

Next, the plurality of images uses the same imaginary line information, and makes a new imaginary line in each of the plurality images using the same imaginary line information. Persons are detected in each of the plurality of images, recognition numbers are allocated thereto, and the number of persons passing the new imaginary line counted more than once is excluded with respect to the plurality of images. Therefore, the problems as stated above with reference to FIGS. 2 and 3 may be resolved.

In detail, an imaginary line is inserted to a single panorama image. Next, the single panorama image including the imaginary line is restored to a plurality of images including same imaginary line information. In this case, an imaginary line newly restored from the same imaginary line information may be inserted into each of the plurality of images. Therefore, information regarding a same imaginary line may be secured in each of the plurality of images.

Persons are extracted from the plurality of images and recognition numbers are allocated thereto. Based on the information used for generating the single panorama image, a same reference numeral is allocated to a person in an overlapping region of the plurality of images. It may be determined whether a person passing an imaginary line overlaps based on the recognition numbers. Detailed description of a person counting device 500 shown in FIG. 5 will be given below. The person counting device 500 includes a single panorama image generating unit 510, a line inserting unit 520, and a person counting unit 530. The person counting device 500 may further include a count statistic unit 570, a transmission unit (not shown), and a count displaying unit (not shown).

Hereinafter, the single panorama image generating unit 510 and the line inserting unit 520 will be described with reference to FIGS. 6, 7(a), and 7(b), the person counting unit 530 will be described with reference to FIGS. 8 and 9, and the count statistic unit 570 will be described with reference to FIG. 10.

The single panorama image generating unit 510 matches a plurality of images captured by respective cameras 501, 502, 503, and 504, that is, a first image, a second image, a third image, . . . , and an $n^{th}$ image, and generates a single panoramic image on a same plane.

The line inserting unit 520 inserts an imaginary line in the single panorama image generated by the single panorama image generating unit 510. The line inserting unit 520 may be embodied to automatically generate an imaginary line in a generated single panorama image by using preset values or may receive an input of an imaginary line from a user via a display screen.

The single panorama image generating unit 510 uses a homography method or an image stitching method to combine a plurality of images captured by a plurality of cameras into a single panorama image. Detailed descriptions thereof will be given below with reference to FIGS. 7(a) and 7(b).

Figure 7A:
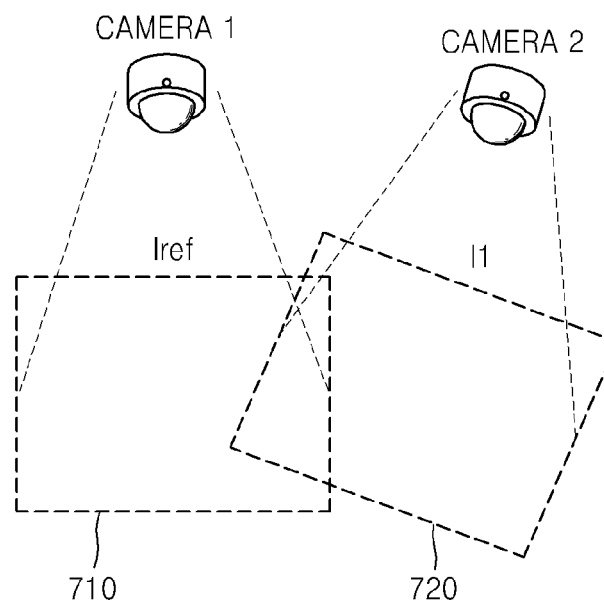
FIG. 7(a) shows matching of two images.
Figure 7B:
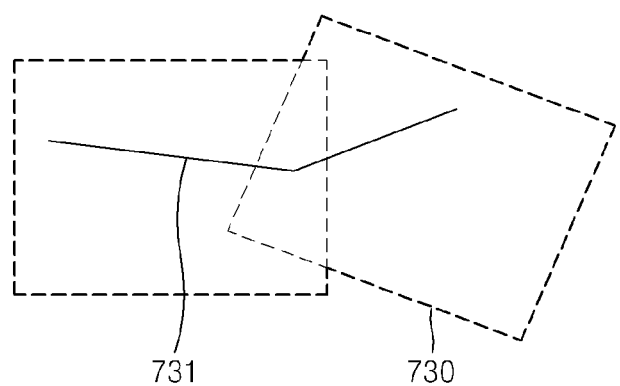
FIG. 7(b) shows an example in which an imaginary line is inserted to a single panorama image generated by matching two images.

FIG. 7(a) shows matching of two images 710 and 720, and FIG. 7(b) shows an example in which an imaginary line 731 is inserted to a single panorama image 730 generated by matching two images 710 and 720.

In the homography method, even if internal parameters of cameras are unknown, homography matrix H may be obtained if there are at least four corresponding points between two images. Equation 1 shows an equation for generating a reference image $I_{ref}$ 710 captured by a first camera and a combining image $I_1$ 720 captured by a second camera to a single panorama image 730 by using the homography matrix H.

$$I_1 = H I_{ref}$$ [Equation 1]

According to Equation 1, a plane the image $I_1$ 720 being captured by the second camera faces may be projected and transferred to the plane of the reference image $I_{ref}$ 720, and thus a single panorama image 730 (FIG. 7(b)) is generated.

Furthermore, according to an exemplary embodiment, the single panorama image generating unit 510 may combine a plurality of images into a single panorama image by using the image stitching method in a case where there are regions not covered by a plurality of cameras due to insufficient overlapping regions between images captured thereby.

Figure 6:
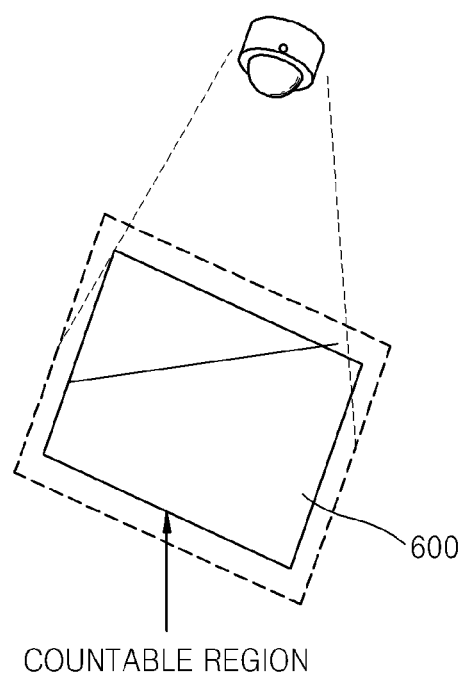
FIG. 6 shows an example of a region used for counting the number of persons in a camera in the related art.

In the related art, only a portion of a surveillance region of a camera is a countable region 600 for counting persons, as shown in FIG. 6. However, according to an exemplary embodiment, a region for counting persons may be expanded via a single panorama image 730 generated by the single panorama image generating unit 510.

FIG. 7(b) shows an example in which an imaginary line 731 is inserted to the generated single panorama image 730. According to an exemplary embodiment, the number of persons passing a particular path, e.g., a shop entrance, an exhibition entrance, and a building entrance, is counted by inserting the imaginary line 731 into the single panorama image 730.

To this end, according to an exemplary embodiment, the line inserting unit (520 of FIG. 5) may freely modify the imaginary line 731 to be inserted to the single panorama image 730. For example, a user may easily draw the imaginary line 731 via a display screen.

If a user changes a location of an imaginary line, the new imaginary line is displayed on a display screen in real time, and the person counting device 500 counts the number of persons passing the new imaginary line drawn by the user.

Furthermore, the single panorama image generating unit 510 generates a single panorama image 730 by reflecting respective parameter changes of the plurality of cameras 501 through 504 in real time, and the generated single panorama image 730 is displayed in real time. In this case, examples of changeable parameters include data regarding panning, tilting, and zooming.

The person counting unit 530 counts the number of persons passing the imaginary line 731 inserted to the single panorama image 730. Detailed descriptions thereof will be given below with reference to FIGS. 8 and 9.

Figure 8:
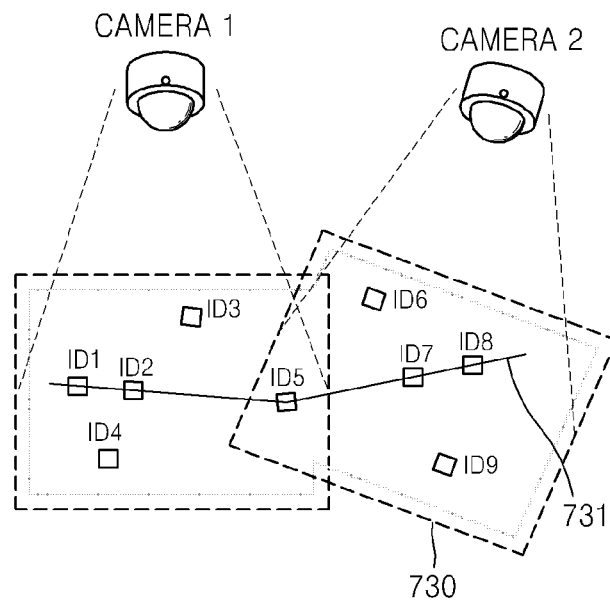
FIG. 8 shows an example in which identification numbers are allocated to respective persons to count the number of persons at an imaginary line in a single panorama image.
Figure 9:
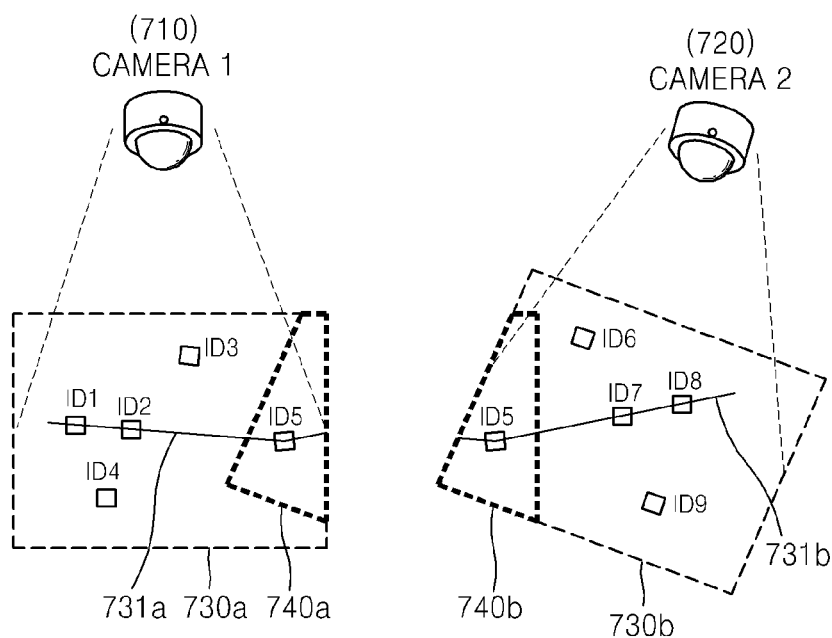
FIG. 9 shows an example of how a person counting unit counts the number of persons.

FIG. 8 shows an example in which identification numbers are allocated to respective persons to count the number of persons at an imaginary line in a single panorama image 730, and FIG. 9 shows an example of how a person counting unit 530 counts the number of persons.

The person counting unit 530 allocates identification numbers ID1 through ID9 to respective persons in the single panorama image 730. In FIG. 8, identification numbers are respectively allocated to nine persons in the single panorama image 730, and the person counting unit 530 only counts the persons ID1, ID2, ID5, ID7, and ID8 passing the imaginary line 731.

The person counting unit 530 counts the number of persons passing the imaginary line 731 as described below.

The person counting unit 530 restores the imaginary line 731 to an image 730a viewed by a first camera 710 and to an image 730b viewed by a second camera 720 via an image restoring unit 540.

To reflect data regarding restored imaginary lines 731a and 731b to images captured by a plurality of cameras, the image restoring unit 540 may apply an $H^{-1}$ matrix, which is the inverse matrix of the H matrix used for matching images, as shown below in Equation 2. Equation 2 is an equation used for restoring images in a case where the single panorama image generating unit 510 utilized the homography method. Therefore, if a single panorama image 730 is generated by using a different matrix, images may be restored by using the inverse matrix of the corresponding matrix.

$$I_{ref} = H^{-1} I_1 \quad \text{[Equation 2]}$$

The image restoring unit 540 may count the numbers of persons passing the imaginary lines 731a and 731b in the plurality of images 730a and 730b, respectively. To this end, information may be received from an object detecting unit 550 and the number of persons passing the imaginary lines 731a and 731b in the plurality of images 730a and 730b may be determined.

Referring to FIG. 9, the object detecting unit 550 determines objects in images being captured by the first camera 710 and the second camera 720.

The object detecting unit 550 determines information regarding the persons ID1, ID2, ID3, ID4, and ID5 based on the image being captured by the first camera 710 and determines information regarding the persons ID5, ID6, ID7, ID8, and ID9 based on the image being captured by the second camera 720.

Next, the object detecting unit 550 may extract information indicating whether the respective persons passed the imaginary lines 731a and 732b based on information regarding overlapping regions 740a and 740b and the plurality of restored imaginary lines 731a and 732b.

The object detecting unit 550 may determine whether each person passed an imaginary line 731a or 732b as a person in or a person out.

A duplication removing unit 560 rules out the number of duplicate-counted persons at the restored imaginary lines 731a and the 731b at a plurality of overlapping regions based on information regarding the overlapping regions 740a and 740b and the imaginary lines 731a and the 731b of the plurality of restored images.

In detail, the object detecting unit 550 detects five persons ID1, ID2, ID3, ID4, and ID5 from an image captured by the first camera 710 and determines that three persons ID1, ID2, and ID5 are passing the imaginary line 731a.

Next, the object detecting unit 550 detects five persons ID5, ID6, ID7, ID8, and ID9 from an image captured by the second camera 720 and determines that three persons ID5, ID7, and ID8 are passing the imaginary line 731b.

The object detecting unit 550 may be embodied to be able to share information with the image restoring unit 540 indicating that the three persons ID1, ID2, and ID5 are passing the imaginary line 731a in the first image 730a and the three persons ID5, ID7, and ID8 are passing the imaginary line 731b in the second image 730b.

Next, based on the information detected by the image restoring unit 540 or the object detecting unit 550, the duplication removing unit 560 determines that the person with the identification number ID5 is duplicate-counted at the imaginary lines 731a and 731b and may subtract the counts of the corresponding person to prevent duplicated counting (i.e., so that ID5 is only counted once).

As described above, the person counting unit 530 may prevent duplicated counting or counting omission of the number of persons even if the number of persons are counted by using image captured by a plurality of cameras.

A count displaying unit (not shown) may display the number of persons counted by the person counting unit 530 on a display unit in real-time. For example, the count displaying unit may be embodied to display the number of persons coming in and the number of persons going out.

Figure 10:
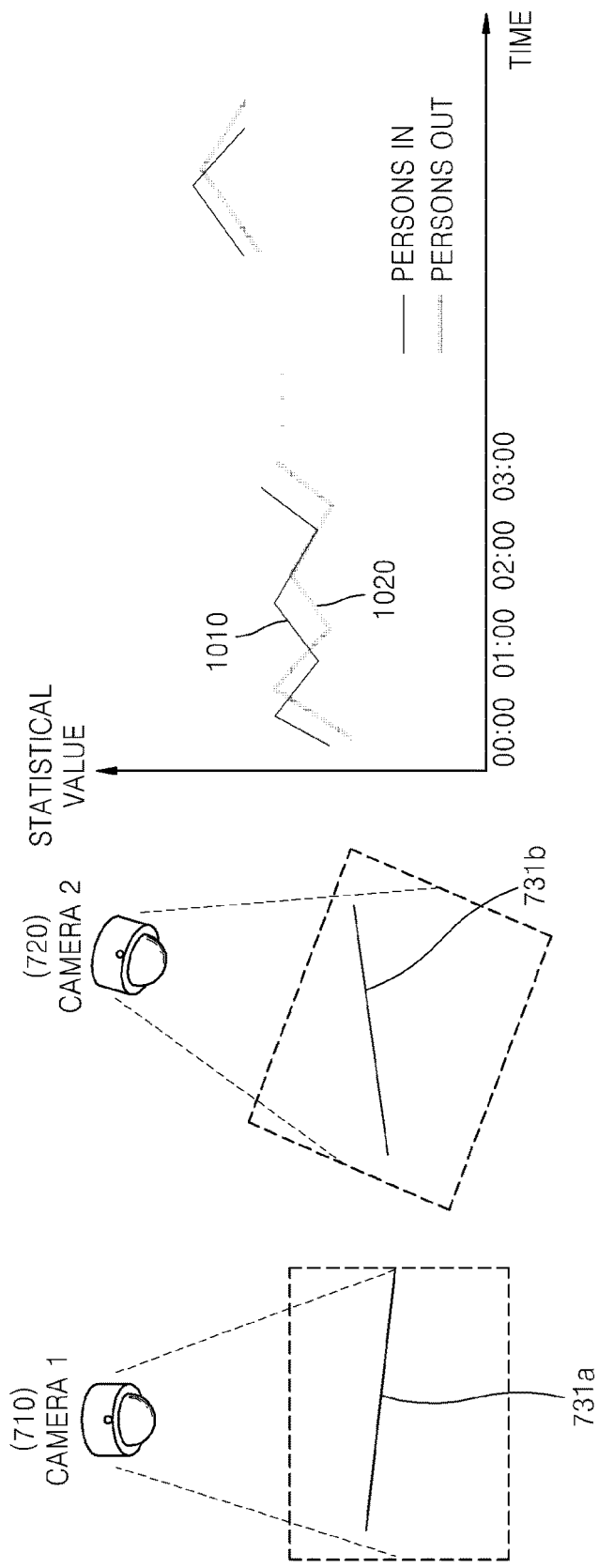
FIG. 10 is a diagram showing a count statistic unit according to an exemplary embodiment.

FIG. 10 is a diagram showing a count statistic unit according to an exemplary embodiment.

The count statistic unit (FIG. 5, 570) generates and manages statistical data regarding the number of persons counted by the person counting unit (FIG. 5, 530). The count statistic unit (FIG. 5, 570) generates statistical data by accumulating the number of persons coming in 1010 or the number of persons going out 1020 across the imaginary lines 731a and 731b per time band designated by a user.

Figure 11:
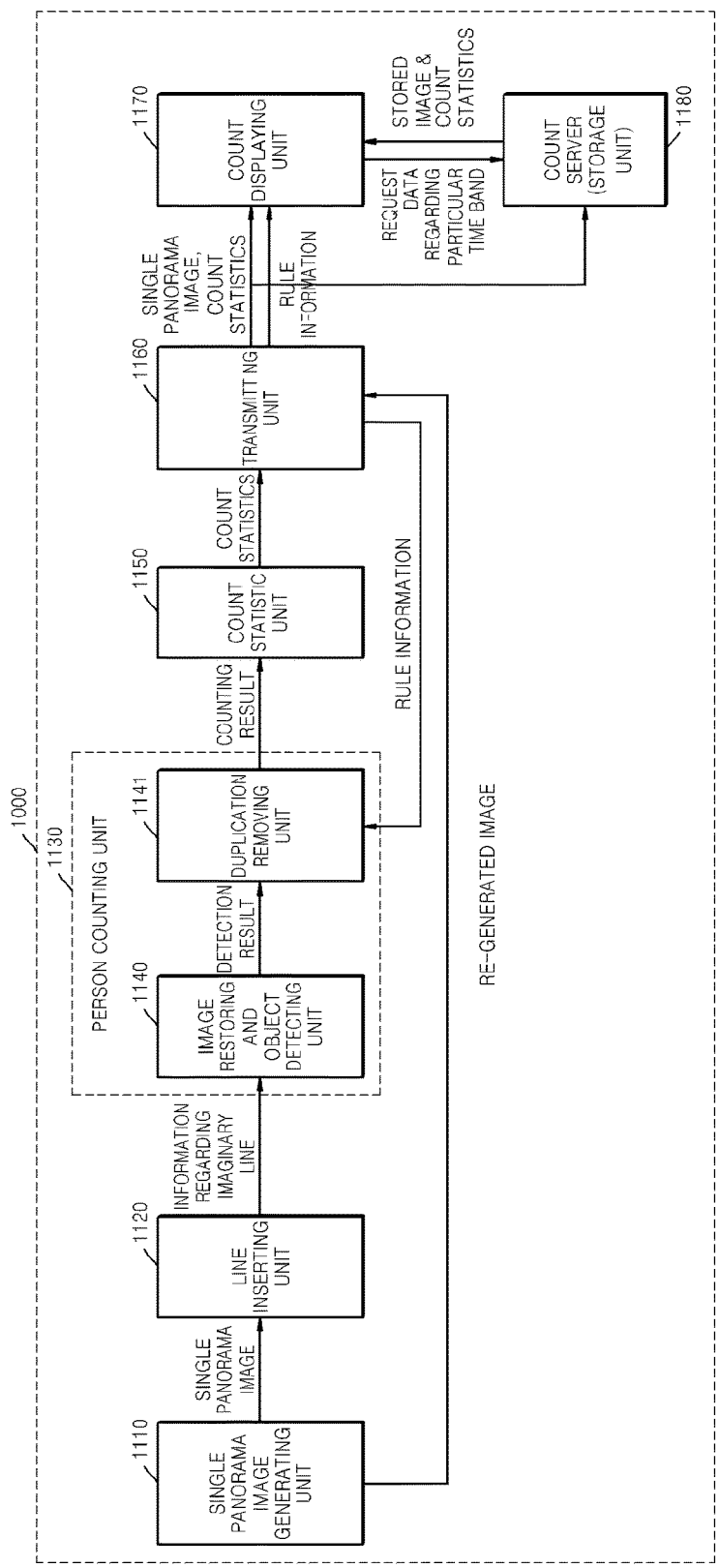
FIG. 11 is a diagram showing the internal configuration of a person counting unit according to another exemplary embodiment.

FIG. 11 is a diagram showing the internal configuration of a person counting unit 1000 according to another exemplary embodiment.

The person counting unit 1000 includes a single panorama image generating unit 1110, a line inserting unit 1120, a person counting unit 1130, a count statistic unit 1150, a transmitting unit 1160, a count displaying unit 1170, and a count server (storage unit) 1180. The person counting unit 1130 includes an image restoring and object detecting unit 1140 and a duplication removing unit 1141.

From among the components shown in FIG. 11, those components corresponding to the components shown in FIG. 5 perform substantially identical or similar functions, and thus detailed descriptions thereof will be omitted.

According to an exemplary embodiment, the count displaying unit 1170 may display statistical data from the count statistic unit 1150, information regarding the number of persons counted by the person counting unit 1130, and a single panorama image on a display screen in real time.

The count statistic unit 1150 may be embodied to transmit statistical data to the count displaying unit 1170 via the transmitting unit 1160. However, the statistical data from the count statistic unit 1150 may be displayed directly on a corresponding display unit without being relayed by the transmitting unit 1160. Furthermore, various other modifications may be made, e.g., statistical data may be displayed on a display screen of a remote device via the transmitting unit 1160.

A storage unit 1180 stores a single panorama image transmitted from the transmitting unit 1160, information regarding an imaginary line inserted to the single panorama image, and statistical data. When a user requests data corresponding to a particular time band, the storage unit 1180 may transmit a stored image and statistical data corresponding to the particular time band to the count displaying unit 1170 based on stored data.

For example, if the count displaying unit 1170 is connected to the storage unit 1180 and a user clicks on a particular time band of a graph shown in FIG. 10, the storage unit 1180 may search for a stored image corresponding to the particular time band and related statistical data, and display the stored image and the statistical data on a display screen.

Therefore, a user may view a graph and re-monitor a moving picture and count statistical data corresponding to an interested time band and may easily notice sudden increases or decreases of counts or information regarding a particular situation.

Figure 12:
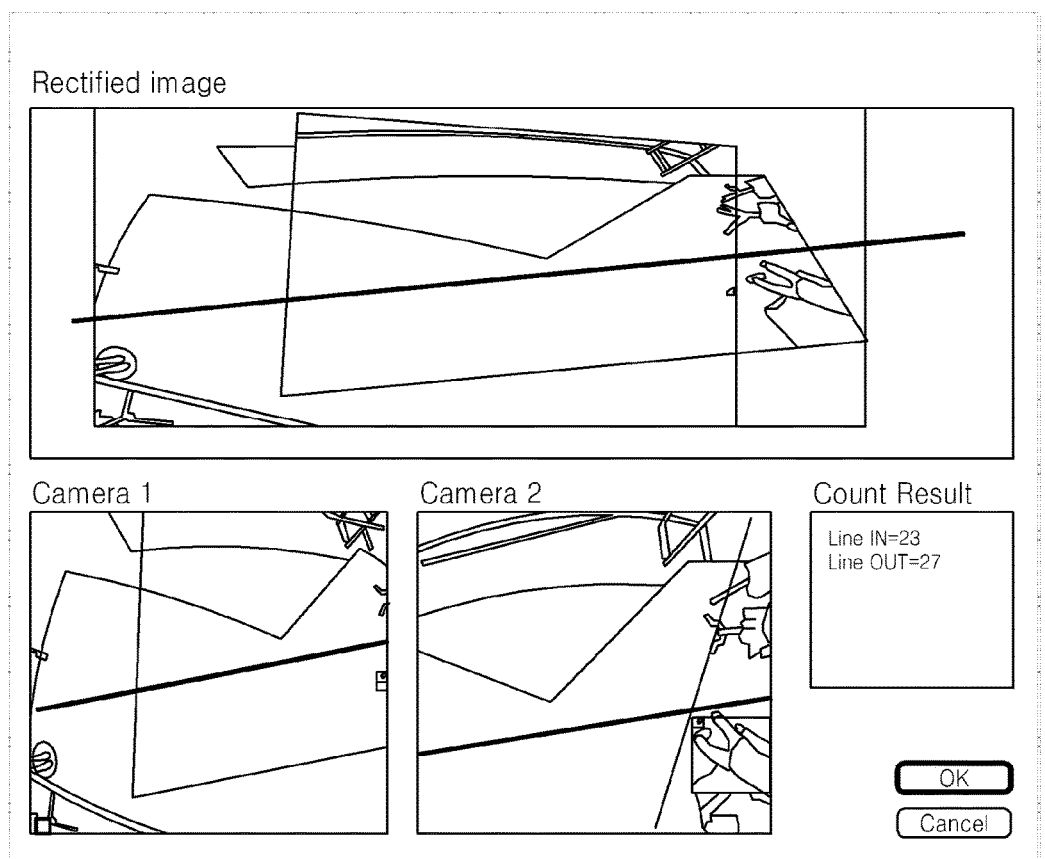
FIG. 12 shows a person counting system based on a plurality of cameras according to an exemplary embodiment.

FIG. 12 shows a person counting system based on a plurality of cameras according to an exemplary embodiment.

Figure 13:
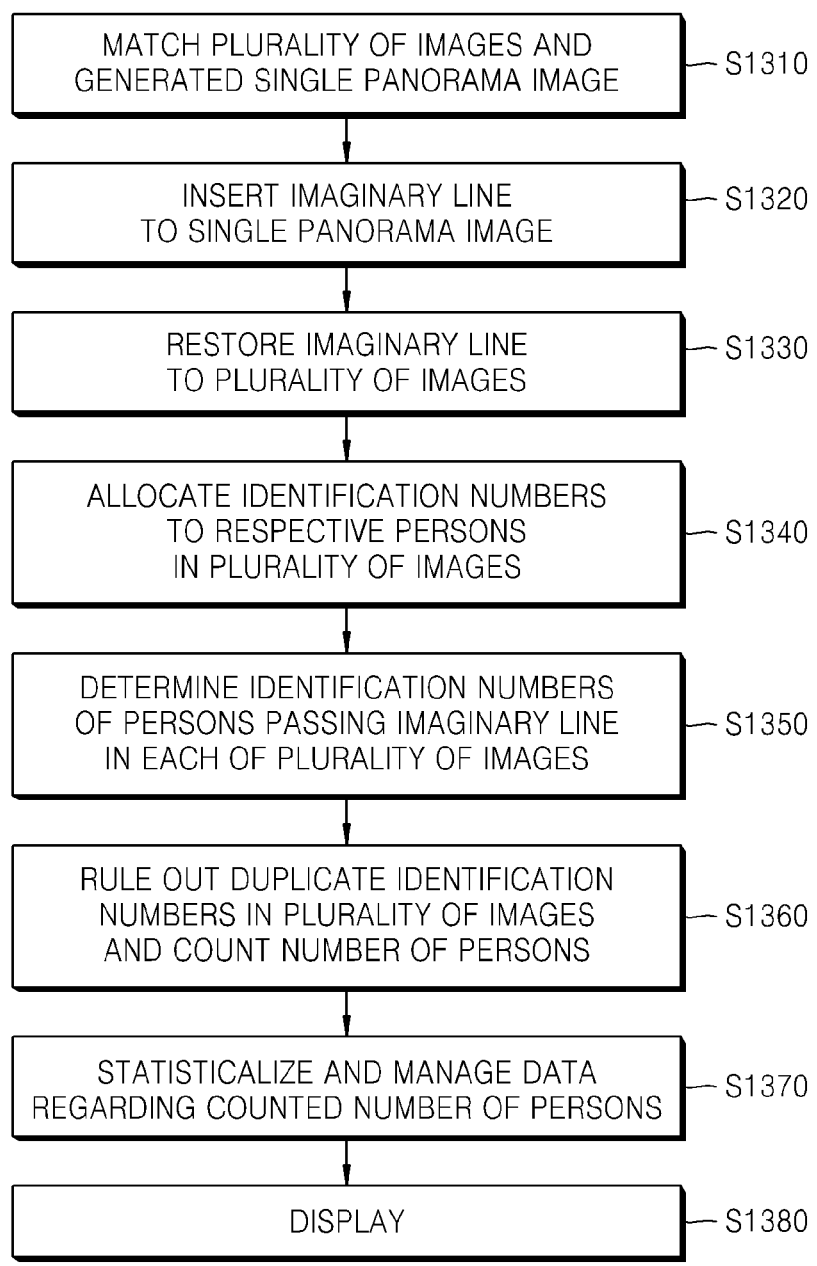
FIG. 13 is a flowchart showing a method by which a person counting system based on a plurality of cameras counts the number of persons.

FIG. 13 is a flowchart showing a method by which a person counting system based on a plurality of cameras counts the number of persons according to an exemplary embodiment. The person counting system based on a plurality of cameras is as shown in FIGS. 5 through 11.

A panoramic single panorama image is generated by merging a plurality of images respectively captured by a plurality of cameras on a same plane using a homography method or an image stitching method (operation S1310). Next, an imaginary line is inserted to the single panorama image (operation S1320). The imaginary line may be generated based on a user input or a preset value. Furthermore, various other modifications may be made, e.g., receiving an input of a new imaginary line in real-time.

The imaginary line in the single panorama image is restored to a plurality of images (operation S1330). Next, identification numbers are allocated to respective persons in the plurality of images (operation S1340).

Persons in each of the plurality of images are counted, and the identification numbers of persons passing an imaginary line in each of the plurality of images are determined (operation S1350). After the identification numbers of persons passing an imaginary line in each of the plurality of images are determined, if there are duplicate identification numbers in the plurality of images, the number of persons are counted after ruling out the duplicate identification numbers (operation S1360).

Next, data regarding the counted number of persons is statisticalized and managed (operation S1370), and statistical data is displayed on a display screen (operation S1380).

While exemplary embodiments have been particularly shown and described, it will be understood by those of ordinary skill in the art that various changes in form and details may be made therein without departing from the spirit and scope of the inventive concept as defined by the appended claims. Exemplary embodiments should be considered in a descriptive sense only and not for purposes of limitation. Descriptions of features or aspects within each exemplary embodiment should typically be considered as available for other similar features or aspects in other exemplary embodiments.

What is claimed is:

1. A person counting device comprising at least one processor to implement:
   a single panorama image generator configured to match a plurality of images respectively captured by a plurality of cameras and generate a single panorama image;
   a line inserter configured to insert an imaginary line to the single panorama image;
   a person counter configured to allocate identification numbers to respective persons in the single panorama image and count the number of persons that pass the imaginary line; and
   a duplication remover configured to rule out a number of duplicate-counted persons by using the identification numbers allocated to the respective persons in a plurality of images which are restored from the single panorama image, information regarding overlapping regions between the plurality of images, and imaginary line information,
   wherein the person counter, in the restored plurality of images, allocates a same identification number to a person in the overlapping regions between the plurality of images.

2. The person counting device of claim 1, wherein the single panorama image generator is configured to generate the single panorama image by using a homography method or an image stitching method, and
   the generated single panorama image is displayed on a display screen.

3. The person counting device of claim 1, wherein the single panorama image generator is configured to generate the single panorama image in real-time by reflecting changes of parameters of each of the plurality of cameras in real-time,
   the generated single panorama image is displayed on a display screen in real-time, and
   the parameters comprise data regarding panning, tilting, and zooming.

4. The person counting device of claim 1, wherein the line inserter is further configured to receive an input of the imaginary line from a user via a display screen.

5. The person counting device of claim 1, further comprising:
   a count statistic unit configured to generate and manage statistical data regarding the number of persons counted by the person counting unit; and
   a transmitter configured to transmit the information regarding the number of persons counted by the person counter or the statistical data.

6. The person counting device of claim 1, further comprising a count displayer configured to display the number of persons counted by the person counting unit on a display screen in real-time.

7. The person counting device of claim 1, further comprising a storage configured to store and manage the statistical data from the count statistic unit.

8. The person counting device of claim 1, wherein the person counter further comprises an object detector configured to detect persons in images respectively captured by a plurality of cameras.

9. A method of counting a number of persons, the method comprising:
   matching a plurality of images respectively captured by a plurality of cameras and generating a single panorama image;
   inserting an imaginary line into the single panorama image;
   allocating identification numbers to respective persons in the single panorama image and counting the number of persons that pass the imaginary line; and
   ruling out a number of duplicate-counted persons by using the identification numbers allocated to the respective persons in a plurality of images which are restored from the single panorama image, information regarding overlapping regions between the plurality of images, and imaginary line information,
   wherein the counting comprises allocating, in the restored plurality of images, a same identification number to a person in the overlapping regions between the plurality of images.

10. The method of claim 9, wherein, in response to the single panorama image being generated, generating the single panorama image by using a homography method or an image stitching method, and
    displaying the generated single panorama image on a display screen.

11. The method of claim 9, wherein the single panorama image is generated in real-time by reflecting changes of parameters of each of the plurality of cameras in real-time,
    the generated single panorama image is displayed on a display screen in real-time, and
    the parameters comprise data regarding panning, tilting, and zooming.

12. The method of claim 9, wherein, in response to the imaginary line being inserted into the single panorama image, imputing the imaginary line from a user via a display screen.

13. The method of claim 9, wherein the allocating and counting further comprises:
    generating and managing statistical data regarding the number of persons counted; and
    transmitting the information regarding the number of persons counted or statistical data.

14. The method of claim 9, further comprising displaying the number of persons counted on a display screen in real-time.

15. A method of counting a number of persons with a system including a plurality of cameras, the method comprising:
- generating a single panorama image based on a plurality of images captured by the respective plurality of cameras;
- inserting an imaginary line into the single panorama image;
- restoring the single panorama image including the imaginary line into a plurality of sub-images including same imaginary line information;
- inserting an imaginary line into each of the plurality of sub-images;
- counting the number of persons that pass each imaginary line in each of the plurality of sub-images; and
- adjusting the counted number of persons by subtracting a number of duplicate counted persons by using information regarding overlapping regions between the plurality of images and imaginary line information,
- wherein the adjusting comprises allocating, in the restored plurality of sub-images, a same identification number to a person in the overlapping regions between the plurality of images.

16. The method of claim 15, wherein each of the plurality of images overlaps with at least one other image of the plurality of images.

17. The method of claim 15, wherein the adjusting comprises:
- identifying a number of persons in the single panorama image;
- allocating a different identification number to each of the identified persons; and
- determining if the identification number of an identified person is counted more than once.

18. The method of claim 15, wherein the inserting the imaginary line into the single panorama image comprises inserting an imaginary line input by a user via a display screen.

19. The method of claim 15, wherein the generating comprises:
- generating the single panorama image by using a homography method or an image stitching method.

* * * * *